(12) United States Patent
Chi Wai

(10) Patent No.: US 9,451,241 B2
(45) Date of Patent: Sep. 20, 2016

(54) DIGITAL CAMERA, LAMINATED PHOTO PRINTER AND SYSTEM FOR MAKING 3D COLOR PICTURES

(71) Applicant: Leung Chi Wai, Chai Wan (CN)

(72) Inventor: Leung Chi Wai, Chai Wan (CN)

( * ) Notice: Subject to any disclaimer, the term of this patent is extended or adjusted under 35 U.S.C. 154(b) by 829 days.

(21) Appl. No.: 13/727,989

(22) Filed: Dec. 27, 2012

(65) Prior Publication Data

US 2014/0036041 A1 Feb. 6, 2014

(30) Foreign Application Priority Data

Aug. 3, 2012 (CN) .......................... 2012 1 0274786

(51) Int. Cl.
| | |
|---|---|
| H04N 13/02 | (2006.01) |
| H04N 13/04 | (2006.01) |
| H04N 5/225 | (2006.01) |
| H04N 9/04 | (2006.01) |

(52) U.S. Cl.
CPC ........ *H04N 13/0242* (2013.01); *H04N 5/2256* (2013.01); *H04N 9/045* (2013.01); *H04N 13/04* (2013.01)

(58) Field of Classification Search
CPC ............. H04N 13/00; H04N 13/0018; H04N 13/0275; H04N 13/0242; H04N 13/04; H04N 21/8146; H04N 21/8153; H04N 21/816; H04N 2213/005; H04N 2013/0465; H04N 19/62; H04N 19/63; G02B 27/22
USPC ........................................................ 348/272
See application file for complete search history.

(56) References Cited

U.S. PATENT DOCUMENTS

| | | | |
|---|---|---|---|
| 3,482,913 A | 12/1969 | Glenn, Jr. | |
| 8,106,949 B2 * | 1/2012 | Tan ...................... | H04N 9/3185 348/177 |
| 8,169,445 B2 | 5/2012 | Scott | |
| 8,786,681 B1 * | 7/2014 | Conran ............... | H04N 13/0264 345/418 |
| 2006/0239336 A1 * | 10/2006 | Baraniuk ................ | H04L 25/20 375/216 |
| 2008/0174704 A1 * | 7/2008 | Tan ...................... | H04N 9/3147 348/745 |
| 2010/0226692 A1 * | 9/2010 | Stelter ................ | G02B 27/2214 399/299 |
| 2010/0245591 A1 * | 9/2010 | Tan ...................... | H04N 9/3185 348/184 |
| 2011/0050853 A1 * | 3/2011 | Zhang .................. | H04N 13/026 348/44 |
| 2011/0304618 A1 * | 12/2011 | Chen ..................... | G06T 7/0022 345/420 |

FOREIGN PATENT DOCUMENTS

| | | |
|---|---|---|
| CN | 1127557 A | 7/1996 |
| CN | 1149164 A | 5/1997 |

(Continued)

*Primary Examiner* — Pritham Prabhakher
(74) *Attorney, Agent, or Firm* — Winstead PC

(57) ABSTRACT

A digital camera includes an electromagnetic spectrum radiator for emitting electromagnetic spectrums to a target when photographing images of the target, a CCD sensor, a CMOS sensor and/or an OLCD sensor, which constitute an independent image element of the photographed image and receive electromagnetic wave radiation bands propagating in the air in different wavelengths as a result of color reactions of the target to the electromagnetic spectrums. The digital camera includes a memory for storing different color values corresponding to different electromagnetic wave radiation bands and a photographing system, which divides the photographed image into over 100 independent images of small area, and which compares the electromagnetic wave radiation band received by the sensors in each independent image of small area to the different color values in the memory, and then inserts colors corresponding to said color values back to said image of small area.

4 Claims, 6 Drawing Sheets

(56) References Cited

FOREIGN PATENT DOCUMENTS

| CN | 1205946 | A | 1/1999 |
| CN | 1231456 | A | 10/1999 |
| CN | 1481759 | A | 3/2004 |
| CN | 1567384 | A | 1/2005 |
| CN | 1645943 | A | 7/2005 |
| CN | 1809748 | A | 7/2006 |
| CN | 101350882 | A | 1/2009 |
| CN | 101385358 | A | 3/2009 |
| CN | 102036010 | A | 4/2011 |
| CN | 102474627 | A | 5/2012 |
| JP | 2003284096 | A | 10/2003 |

\* cited by examiner

0916A

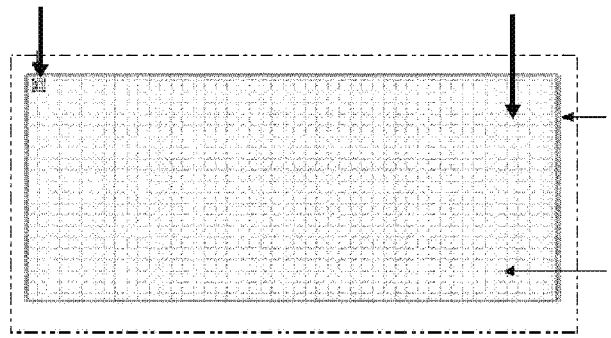

0916B

TABLE 1

| code | small area positions of image element sensors | | distributing to the printing material positions of the printer | image printing layer | image printing material |
|---|---|---|---|---|---|
| a | *a1~a30 | → | $1^{st}$ - a1~a30 | layer 1 | transparent or non-transparent film or paper |
| b | *b1~b14 | → | $2^{nd}$- b1~b14 | layer 2 | |
| c | c1~c20 | → | $3^{rd}$- c1~c20 | layer 3 | |
| d | d1~d23 | → | $4^{th}$-d1~d23 | layer 4 | |
| e | e1~e29 | → | $5^{th}$-e1~e29 | layer 5 | |
| f | f1~f32 | → | $6^{th}$-f1~f32 | layer 6 | |
| g | g1~g34 | → | $7^{th}$-g1~g34 | layer 7 | |
| h | h1~h37 | → | $8^{th}$-h1~h37 | layer 8 | |
| xy | xy1~xy9,000,000 | → | $9^{th}$-$50^{th}$-xy1~xy9,000,000 | images above layer 9 | |
| i | i1~i3,555,555 | → | ∞-i1~i3,555,555 | bottom layer distant view image | |

FIG. 5

DIGITAL CAMERA, LAMINATED PHOTO PRINTER AND SYSTEM FOR MAKING 3D COLOR PICTURES

TECHNICAL FIELD

The present invention relates to a digital camera and a corresponding system for making 3D color pictures. In particular, the present invention relates to a digital camera having a night vision shooting function and a corresponding system for making 3D color pictures, and the present invention further relates to a corresponding laminated photo image printer.

BACKGROUND OF THE INVENTION

There are various methods for photographing pictures containing 3D information and for reproducing pictures. The Chinese patent publication CN1645943A discloses an electronic camera and an image generating apparatus which generate a stereo image adapted to enable appropriate luminance level (print density) control to be performed even when the image is printed using a print apparatus having an exposure correcting function. In this patent application, a CCD color image pickup element forms a right and left parallel object images and photoelectrically converts the object images into a object image signal. In this case, the object image signal is analyzed in an exposure control section to calculate exposure information on a predetermined photometric area. Then, when an SPM synthesizing section generates a stereo image from the object image signal, a partition area setting section sets the luminance level of a partition are on the basis of the exposure information on the parallel object images, the partition area is a median strip used to arrange monocular images of the parallel object images away from each other.

However, this prior art technique fails to solve the problem of composite making of multiple-layer images.

Various night vision shooting methods have been disclosed in the prior art, but these methods are not ideal enough in reproducing the color of the target. Thus it is necessary to provide a digital camera having a night vision shooting function but with further improved color reproduction capability. Especially, it is necessary to provide a 3D photographing digital camera capable of improving color reproduction under a night vision shooting mode.

SUMMARY OF THE INVENTION

The technical problem to be solved by the present invention is to provide a digital camera capable of improving color reproduction under a night vision shooting mode, especially a 3D photographing digital camera, as well as a corresponding system for making 3D color pictures. Correspondingly, it is necessary to provide a laminated photo image printer and a system for making 3D color pictures to make images photographed by said 3D photographing digital camera.

The digital camera according to the present invention comprises: an electromagnetic spectrum radiator for emitting electromagnetic spectrums to a target when photographing images of the target; a charge coupled device (CCD) sensor, a complementary metal oxide semiconductor (CMOS) sensor and/or an OLCD sensor, which constitute an independent image element of the picked-up image and receive electromagnetic wave radiation bands propagating in the air in different wavelengths as a result of color reactions of the target to said electromagnetic spectrums; a memory for storing different color values corresponding to different electromagnetic wave radiation bands; and a photographing system, which divides the photographed image into over 100 independent images of small area, and which compares the electromagnetic wave radiation band received by the sensors in each independent image of small area to the different color values in the memory, and then inserts colors corresponding to said color values back to said image of small area. Different colors of the object will emit electromagnetic wave radiation bands of different wavelengths upon receiving the emitted electromagnetic spectrums, so according to this solution of the present invention, by preparing and storing various color values corresponding to the electromagnetic wave radiation bands, the digital camera is enabled to truly reproduce the original color of the target under a night vision shooting mode Preferably, said digital camera further comprises: a spacing signal analyzer, which sends a spacing signal output of deviated or accurate focusing with respect to each single CCD or CMOS or OLCD sensor so as to open the CCD or CMOS or OLCD sensor with accurate focusing and close the CCD or CMOS or OLCD sensor with deviated focusing; a built-in range finder for continuously and repeatedly performing range finding and focusing to different positions of an image at a speed of over 22 times per second; the photographing system continuously photographing different positions of the target with accurate focusing with reference to the control by the spacing signal analyzer to open/close the CCD or CMOS or OLCD sensor, wherein the obtained small area images corresponding to different positions are superimposed to finally obtain a 3D image of the target image. In said improved solution, by controlling the open/close of the single CCD or CMOS or OLCD sensor, only the position of accurate focusing is clearly photographed each time, and by superimposing the small area images of such positions, a clear laminated 3D image can be formed.

According to a further improvement to said digital camera, when there is a transparent object between the camera and the target, before photographing the image, a focusing setting is performed to the foremost point of the first layer of image of said target and a focusing setting is performed to each of the layers above the second layer of image in advance, then the foremost point of the first layer of image is photographed and each of the layers above the second layer of image is photographed, \ herein said focusing setting and photographing are performed manually or automatically. By means of said measure, the possibility of the transparent object interfering an accurate focusing of the camera is removed, and a clear 3D image can be obtained by photographing the target layer by layer.

Further preferably, in said digital camera, the photographed image is divided into 800-900000 independent images of small area and/or said built-in range finder performs range finding and focusing at a speed of 22-10000 times per second.

The system for making 3D color pictures according to the present invention comprises one or two said digital cameras, which are used for photographing images of the spacing signal processing mode and/or images of independent small area processing mode, said images being input into a laminated photo printer to be printed into laminated 3D photos.

It is hard for common consumers to make stereo photos by themselves at present, and only professionals can make such photos, but by using the visual system of the present invention, common consumers are enabled to make photo products that create a new visual sensation at home.

The working principle of the system for making 3D color pictures of the present invention is using data to make multiple-layer images of a stereo environment and then compounding such images.

By an operation similar to controlling an existing common printer, the stereo environment image can be repeatedly reproduced on a 3D color photo.

Since it is hard for common consumers to make 3D color photos, and only professional can make such 3D color photos by means of specific devices, other purposes and popularity of digital cameras are limited. However, by means of the digital laminated camera of the present invention, after photographing images, a laminated photo image printer is used to make a new 3D color photo.

The present invention improves the cameras available on the market into using a spacing signal analyzer to output the spacing signal with deviated focusing of the CCD (charge coupled device) or CMOS (complementary metal oxide semiconductor) or OLCD (organic liquid crystal display) sensor as the open/close instruction by means of the principle of controlling the focusing by a spacing signal in a phase detection focusing manner, wherein each layer of the object is accurately focused, and the CCD/CMOS/OLCD sensors of the layers that have been accurately focused are opened, while the CCD/CMOS/OLCD sensors of the layers that have been erroneously focused are closed, thus a clear image of each layer is obtained, then the images of all layers are superimposed, and a specified output signal of the clear image of each layer is sent to an image position, thus making the laminated photo. The unclear image of each layer is removed to leave blank and transparent space for reproduction of the clear image of the next layer, thereby forming a laminated 3D image; afterwards, the laminated photo image printer of the present invention is used to print a 3D color photo.

The digital laminated camera of the present invention uses each of the CCD sensor. CMOS sensor and ° LCD sensor of the image element to form an individual of the CCD or CMOS or OLCD sensor of an independent image element, said individual of CCD or CMOS or OLCD sensor is configured to be controlled by a signal after picking up an image, the range finder divides a whole image into independent small areas and continuously and repeatedly measures images of different positions and ranges, and then by means of the obtained information, the spacing signal analyzer sends an open/close instruction of a spacing signal output of deviated or accurate focusing of each single CCD or CMOS or OLCD sensor. The desired output spacing signal image appears at a specified position, so that the accurately focused CCD or CMOS or OLCD sensor is open, while the deviatedly focused CCD or CMOS or OLCD sensor is closed.

When photographing an object, especially an object with an unclear profile, said digital laminated camera comprises: a built-in range finder and a photographing system that divides a photo into over 100, preferably over 800, and more preferably 800-900000, independent small areas to perform image photographing, by using combining and photographing systems that incorporate several groups of built-in range finders, range finding and photographing can be performed to different positions of an image, meanwhile, each combining and photographing system can continuously measure the distances of different positions of the target image repeatedly at a speed of over 22 times per second, then synchronous photographing of the digital laminated camera is controlled by using the obtained information, finally photographing of the whole photo image is completed.

The digital laminated camera of the present invention is characterized in that before photographing an image, a focusing setting is performed to the foremost point of the first layer of image and a focusing setting is performed to each of the layers above the second layer of image in advance.

The laminated photo image printer of the present invention is characterized in that multiple transparent films are automatically printed continuously using dyes in different phases and are then combined, the transparent films in each phase, corresponding to the digital laminated camera, focuses and photographing the target under an electromagnetic wave night vision shooting mode in combination with the independent small area processing mode; next, a hot pressing and jointing are repeatedly performed alter each time of printing until all the needed transparent film printing and hot pressing and jointing have been finished.

The laminated photo image printer of the present invention is characterized by using transparent or colored films.

The laminated photo image printer of the present invention is characterized in that a square hole for positioning is made in the corner of the film at a position of 2.00-8.00 mm from the outer edge, then printing is performed and hot pressing is performed by means of chemicals to finish the operation of jointing.

The system for making 3D color pictures of the present invention is characterized by comprising the above-mentioned digital laminated camera and the above-mentioned laminated photo image printer.

BRIEF DESCRIPTION OF THE DRAWINGS

FIG. 5 shows the solution of operation of the image element sensor of the digital laminated camera of the present invention.

DETAILED DESCRIPTION OF THE INVENTION

Figure 1:
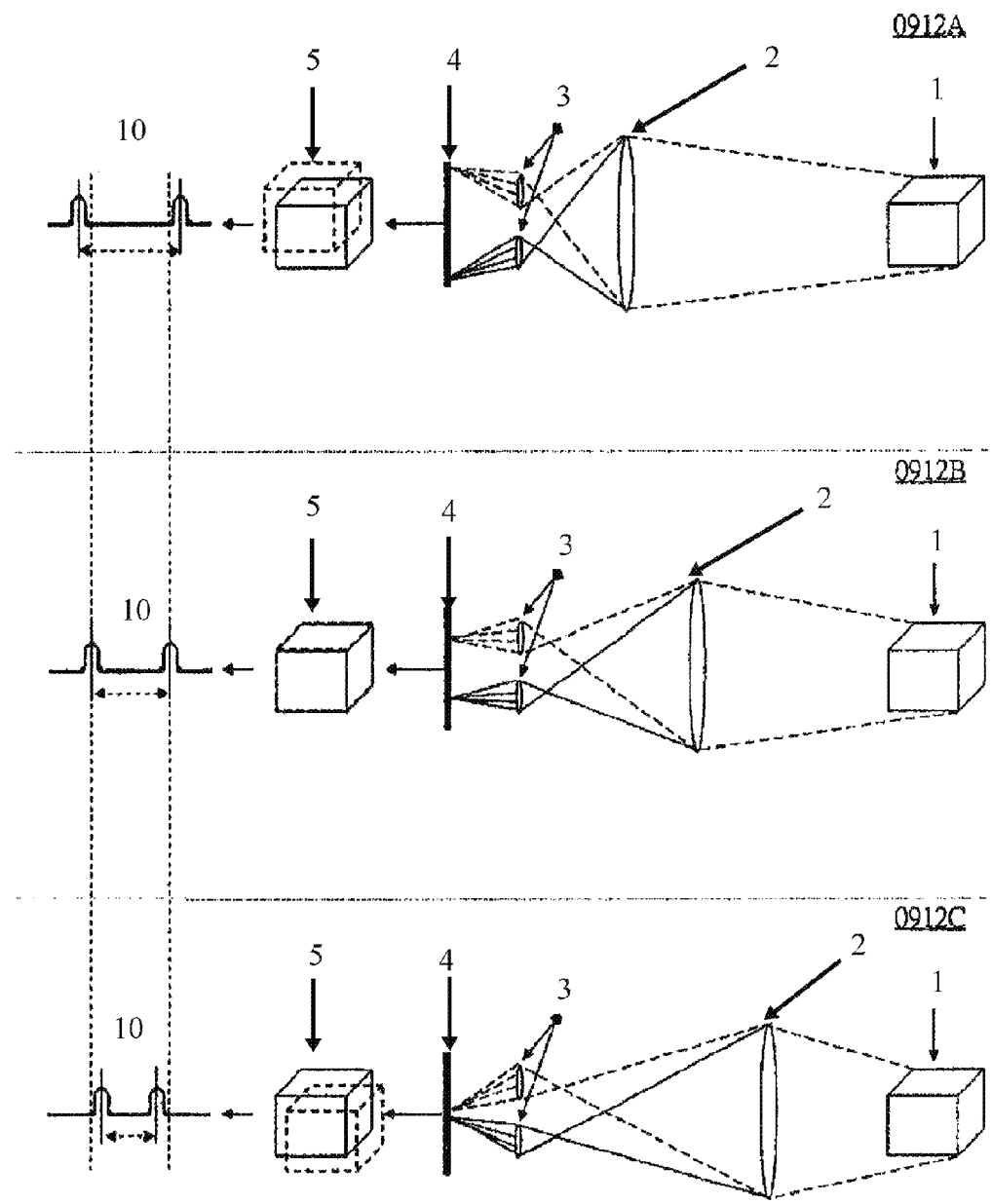
FIG. 1 shows the solutions of phase detection and focusing of the digital laminated camera using a CCD or CMOS or OLCD sensor of the present invention.

FIG. 1 shows the solutions of phase detection and focusing of the digital laminated camera using a CCD or CMOS or OLCD sensor of the present invention.

As shown in FIG. 1, the upper, middle and lower figures therein respectively represent the three circumstances of the focusing lens of the camera is too far behind the analyzing lens, correctly positioned with respect to the analyzing lens and too far ahead of the analyzing lens.

As shown by the upper part (0912A) of FIG. 1, a focusing lens 2 of the camera is too far behind an analyzing lens 3, an image 5 of a focusing image object 1 formed on a CCD or CMOS or OLCD sensor 4 after passing the focusing lens 2 and the analyzing lens 3 is too far behind, thus the period of an image spacing signal 10 is too long when the CCD or CMOS or OLCD sensor 4 is focusing, then a spacing signal analyzer 22 will close output of said part of deviatedly focused spacing signal of the CCD or CMOS or OLCD sensor 4.

As shown by the lower part (0912C) of FIG. 1, the focusing lens 2 of the camera is too far ahead of the analyzing lens 3, the image 5 of the focusing image object 1 formed on the CCD or CMOS or OLCD sensor 4 after passing the focusing lens 2 and the analyzing lens 3 is too far ahead, thus the period of the image spacing signal 10 is too short when the CCD or CMOS or OLCD sensor 4 is focusing, then the spacing signal analyzer 22 will close output of said part of deviatedly focused spacing signal of the CCD or CMOS or OLCD sensor 4.

As shown by the middle part (0912B) of FIG. 1, the focusing lens of the camera is at a correct position with respect to the analyzing lens, a correct image 5 of the focusing image object 1 is formed on the CCD or CMOS or OLCD sensor 4 after passing the focusing lens 2 and the analyzing lens 3, thus the period of the image spacing signal 10 is moderate when the CCD or CMOS or OLCD sensor 4 is focusing, then the spacing signal analyzer 22 will open output of said part of deviatedly focused spacing signal of the CCD or CMOS or OLCD sensor 4.

Figure 2:
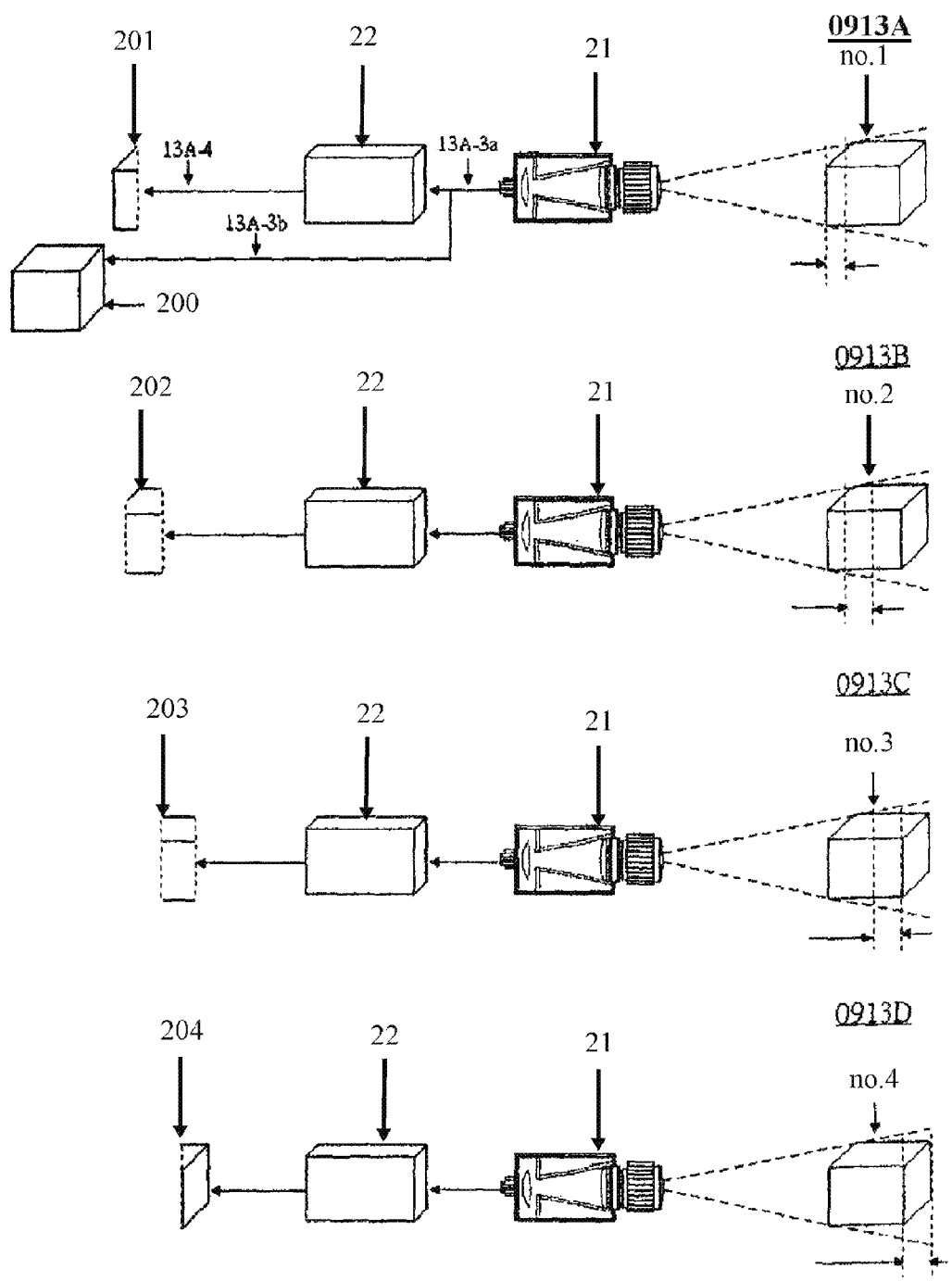
FIG. 2 shows the solutions of photographing focusing and outputting of the digital laminated camera of the present invention.

FIG. 2 shows embodiments of photographing focusing and outputting of the digital laminated camera of the present invention. Referring to the four figures (0913A, 0913B, 0913C and 0913D) from top to bottom in FIG. 2, the photographing focusing position and output manner is that after starting photographing of the first image of an already set position by the digital laminated camera manually or automatically, the rest of the plurality of multiple-layer images that have been set but not photographed yet will be photographed automatically.

As shown by 0913A in FIG. 2, no. 1 represents the preset focusing position. A camera 21 sets a plurality of first-stage foremost focal points manually or automatically for image photographing, and an analyzer 22 opens or closes the part of spacing signal output with accurate/deviated focusing. Numerals 200 and 201 denote an image of the output general single signal at present and an image of the output signal of the analyzer 22, respectively.

Likewise, in 0913B, 0913C and 0914D of FIG. 2, no. 2, no. 3 and no. 4 represent preset focusing, positions, and numerals 202, 203 and 204 represent images of the corresponding output signals, respectively.

Figure 3:
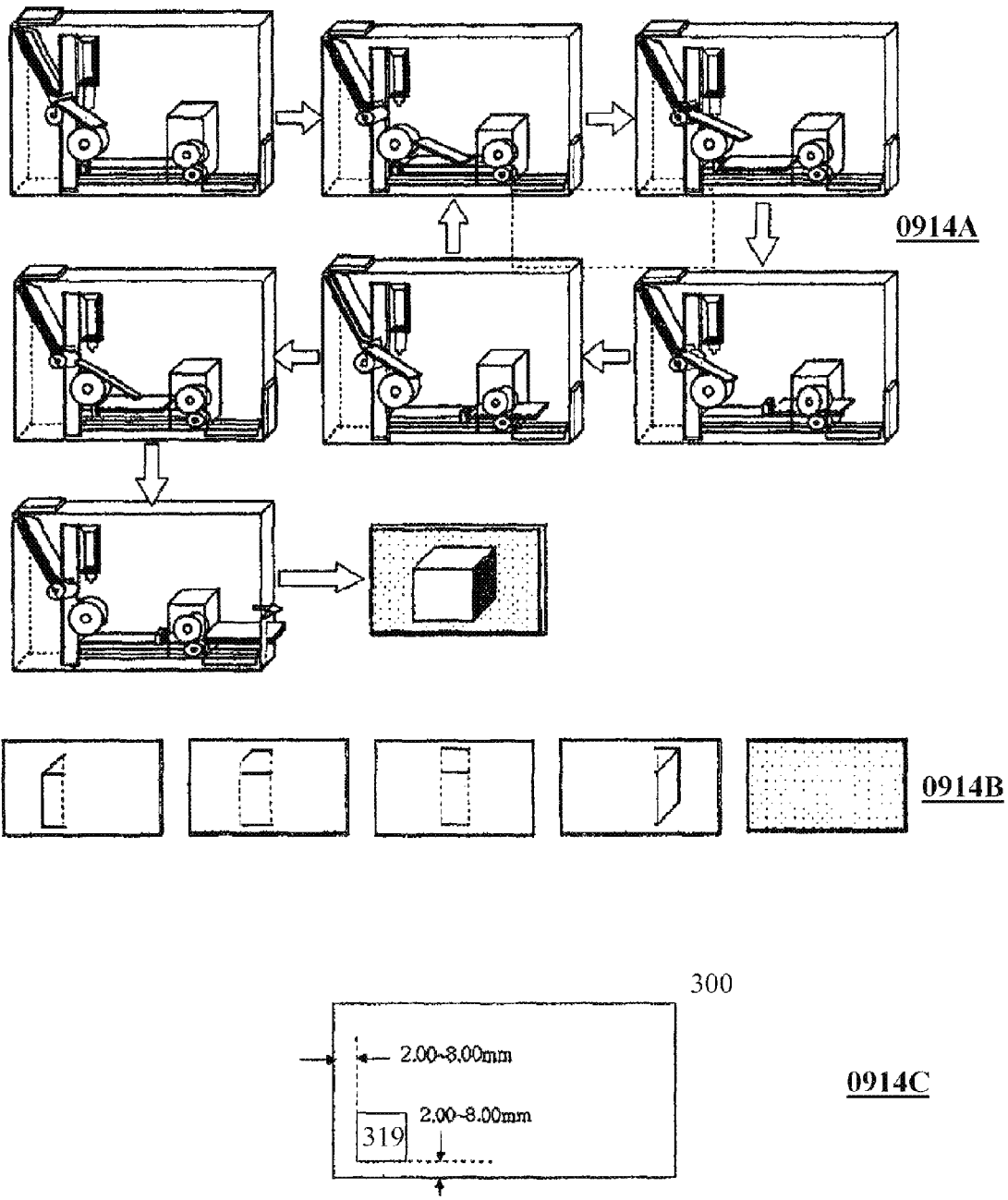
FIG. 3 shows the printing solution of the digital laminated photo image printer of the present invention.

FIG. 3 shows the printing solution of the digital laminated photo image printer of the present invention. As shown by part 0914C in FIG. 3, the digital laminated photo image printer uses a transparent or colored film 330 to print images. A square hole 319 is made in one of the corners of the film 330 at a position of a certain distance from the outer edge, which is used for accurate positioning during film lamination. Said certain distance is 2.00-8.00.

As shown in FIG. 3, referring to the part 0914A in FIG. 3, the thick arrows between the steps illustrate the steps of the printing process:
1. first, printing the first phase pattern by the printer (step 201);
2. then, combining patterns of the two phases, and combining to the previous film (step 302);
3. next, starting the printing of the next phase pattern and combining to the previous films (step 303);
4. subsequently, hot pressing the films using chemicals to prepare for printing of the next phase pattern (step 304);
5. then, making the film to go back to its original position to start printing the next phase pattern (step 305); steps 302-305 can be repeated as desired;
6. loading the films and hot pressing the films using chemicals (step 306);
7. finishing the digital laminated photo 310 (step 307).

Part 0914B in FIG. 3 shows images 311-314 of the printing patterns of respective phases before the combining. Numeral 320 represents the bottom film.

Figure 4:
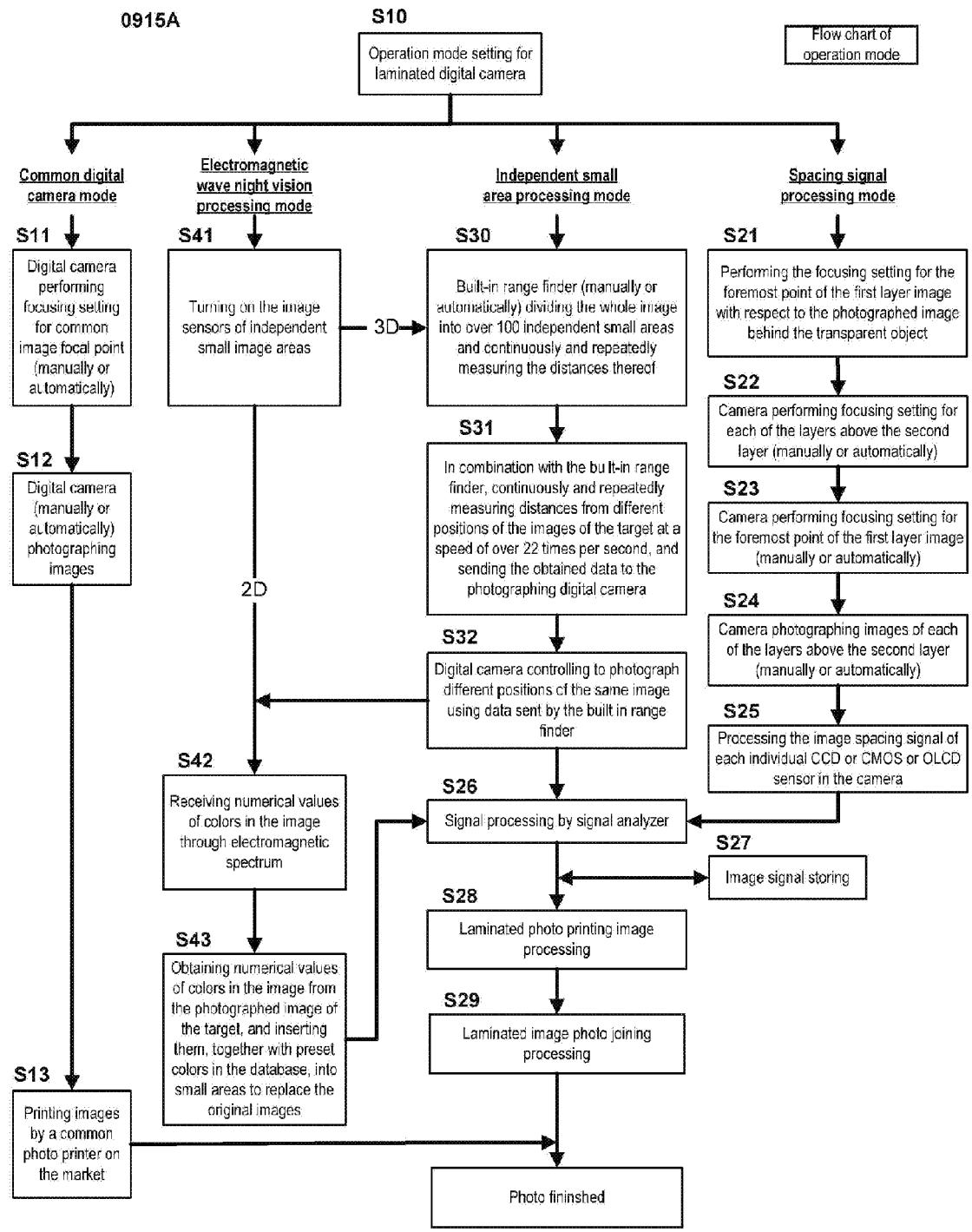
FIG. 4 shows a flow chart of the photographing and printing process of the digital camera of the present invention.

FIG. 4 shows a flow chart of the photographing process of the digital camera of the present invention. As shown in FIG. 4, an operation mode setting for the digital laminated camera is set first (S10). Wherein, mode 1 is the operation mode of a common digital camera; mode 2 is the operation mode of the digital laminated camera of the present invention; mode 3 is the electromagnetic wave night vision operation mode of the present invention. The camera of the present invention further has an independent small area processing mode 4, which can be used by being incorporated into mode 3 so as to form the function of the night vision 3D digital laminated camera unique to the present invention.

In the operation mode setting for the digital camera (S30) shown in FIG. 4, the built-in range finder will divide the whole image into over 100, preferably over 800-900000, independent small areas, and then continuously and repeatedly measure the distances of different positions and performs focusing. Afterwards, the obtained information of independent small areas is used to photograph (S31). By means of the information of the independent small areas, this part of signal of the CCD or CMOS or OLCD sensor is set to be output to the signal analyzer (S26) to be processed (S32).

When it is set to be mode 1, the camera manually or automatically performs focusing setting for the general image focal point (S11). The camera can thus photograph images manually or automatically (S12). Then, a digital laminated printer on the market that is similar to a common photo printer to print color images (S13).

In the electromagnetic wave night vision operation mode 3 (S41), the electromagnetic spectrum radiator of the camera emits electromagnetic spectrums to the target when photographing images of the target; a CCD sensor, a CMOS sensor and/or an OLCD sensor receive electromagnetic wave radiation bands propagating in the air in different wavelengths as a result of color reactions of the target to said electromagnetic spectrums. A photographing system divides the photographed image into over 100 independent images of small area, and compares the electromagnetic wave radiation bands received by the sensors in each independent image of small area to the different color values pre-stored in the memory, and then inserts colors corresponding to said color values back to said image of small area. Since the true colors of different parts of the target are mapped to the respective images of small area, the digital camera is enabled to truly reproduce the original color of the target under a night vision shooting mode If only a one-time focusing photographing is performed in said mode 3, a 2D image with good reproducibility can be obtained. Preferably, said mode 3 can be used in combination with the independent small area processing mode 4 so as to obtain 3D images with good reproducibility. Specifically, said photographing is not done by one-time focusing photographing, but it is done by several times of focusing photographing. Here, a built-in range finder continuously and repeatedly performs range finding and focusing to different positions of an image at a speed of over 22 times per second. According to the accuracy of focusing, the spacing signal analyzer selectively opens the CCD or CMOS or OLCD sensor with accurate focusing and closes the CCD or CMOS or OLCD sensor with deviated focusing, thus each photographing by the photographing system only records the clear portion of the image corresponding to the accurate focusing, while ignoring the unclear portions. In this case, by continuously photographing different positions of the target with accurate focusing, the photographing system can superimpose the obtained respective small area images corresponding to said different positions to finally obtain the 3D image of the target.

The digital camera of the present invention can also be used in combination with the spacing signal processing mode, and this is particularly useful when there is a transparent object between the camera and the target. Through this measure, the possibility of the transparent object interfering an accurate focusing of the camera is removed, and a clear 3D image can be obtained by photographing the target layer by layer. Specifically, when it is set to be a spacing signal processing mode, the camera manually or automatically performs focusing setting for the foremost point of the first layer image (S21). Next, the camera manually or automatically performs focusing setting for each of the layers above the second layer (S22). Then the camera manually or automatically performs photographing of the foremost point of the first layer image (S23). Next, the camera manually or automatically performs photographing of each layer of image above the second layer (S24). During each photographing, each CCD or CMOS or OLCD sensor in the camera performs an image spacing signal processing (S25), such that only the CCD or CMOS or OLCD sensor with accurate focusing is opened. Subsequently, the spacing signal analyzer performs signal processing to the photographed images (S26). Then the image signals are stored (S27). So far, the photographing process is ended. Afterwards, a photo image printing processing might be performed (S28). Finally, hot pressing of the photo images is performed using chemicals (S29) to finish the digital laminated photo of the present invention. FIG. 5 shows the contents of images processed by the image element sensor element of the CCD or CMOS or OLCD. The built-in range finder shown by part 0916A of FIG. 5 will divide the whole image into over 100, preferably 800-900000, independent small areas, and continuously and repeatedly measure distances of different positions of the target. Then, photographing is performed by means of the obtained information of the independent small areas and said part of signal that sets the CCD or CMOS or OLCD sensor is output or closed. In this embodiment, the camera divides the target into 51 layers, which are represented by a, b, c, d, e, f, g, h, xy and i. a1 represents the image element sensor element of the improved CCD or CMOS or OLCD and represents the first small area of the closest layer, said independent small area being in the process of photographing image and the sensor at this position being turned on. a2 represents the image element sensor element of the CCD or CMOS or OLCD, which is divided into more than 100 independent, small image areas for photographing image after being improved, a3 represents the image element sensor of the CCD or CMOS or OLCD. a4 represents that the image sensor will be turned off when all independent small image areas of the light sensitive image element inductor are not in the process of photographing images.

Part 0916B of FIG. 5 is a specification of the printing positions of layer 1 to layer ∞. Table 1 is a specification relating to distributing images to the image printers, wherein a1-a30 represent that the image element sensors will distribute images in small areas a1-a30 to positions a1-a30 of layer 1 of the printer; b1-b14 represent that the image element sensors will distribute images in small areas b1-b14 to positions b1-b14 of layer 2 of the printer.

Figure 6:
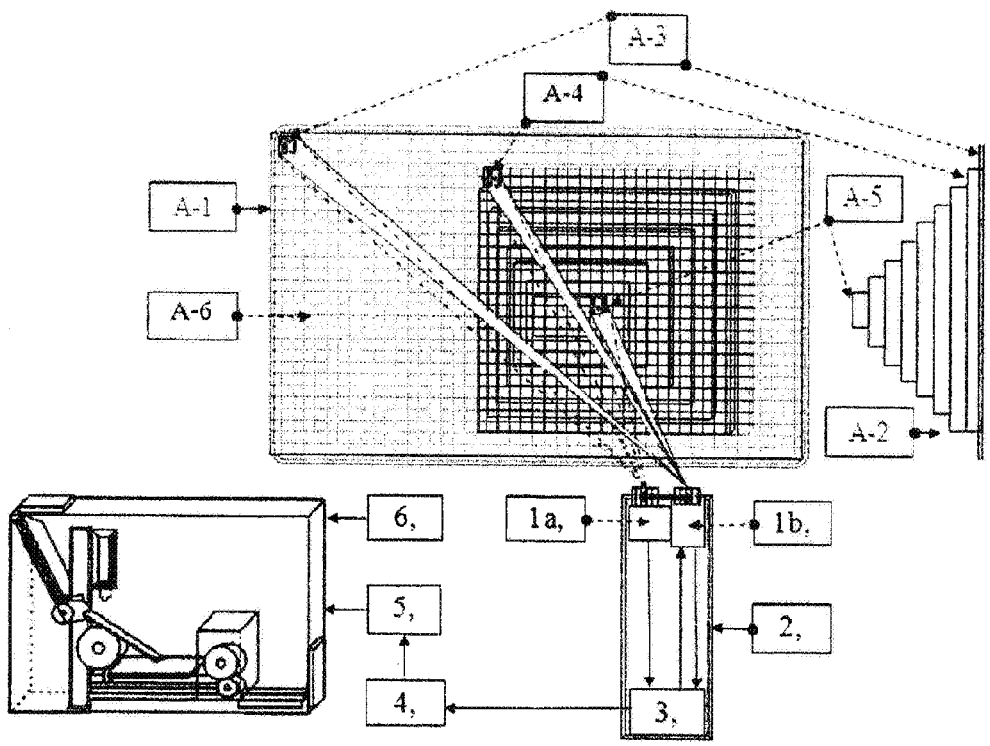
FIG. 6 shows the solutions of image photographing and outputting of the digital laminated camera of the present invention.

FIG. 6 reflects the way of photographing of the small image area of the digital laminated camera, and it shows photographing the independent small areas and outputting or closing the part of signal that sets the CCD or CMOS or OLCD sensor.

Now FIG. 6 will be further described:

A-1: A front elevation of a 3D scene is demonstratively photographed.

A-2: A side elevation of a 3D scene is demonstratively photographed.

A-3: A digital laminated camera divides a scene photo into over 100, preferably 800-900000, independent small areas, and then measures the distances thereof and photographs them; in the figure, the demonstration position is 00, i.e. the image pickup position of the independent small area of a distant view image layer (layer i).

A-4: the digital laminated camera is measuring and photographing images in the shown independent small area, at this time, the demonstration position is the $8^{th}$ position, i.e. the image pickup position of the independent small area of layer 8.

A-5: the digital laminated camera is measuring and photographing images in the shown independent small area, at this time, the demonstration position is the $1^{st}$ position, i.e. the image pickup position of the independent small area of layer 1.

A-6: the shown 3D scene image of the independent small area is waiting to be measured and photographed by the digital laminated camera.

1*a*; range finder;
1*b*: camera scanner;
2: digital laminated camera;
3: hybrid encoding distributor (in the digital laminated camera)
4: signal decoder;
5: distributor for 3D image printing positions;
6: laminated photo image printer; it starts printing of the next phase and prepares for jointing.

Figure 7:
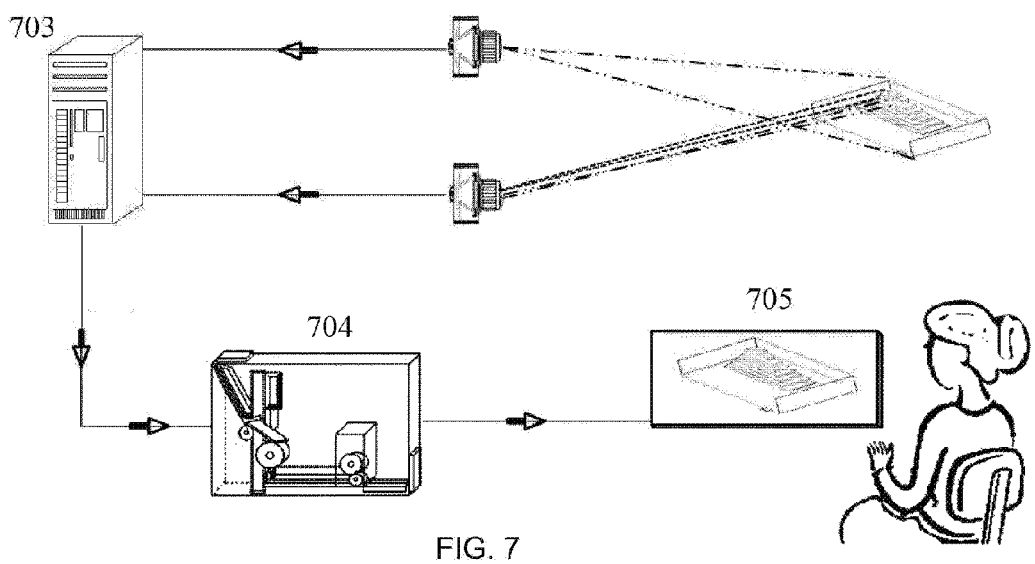
FIG. 7 shows the operation process of the digital laminated camera of the present invention.

Now, reference will be made to FIG. 7 to further describe the operation process of the digital laminated photographing system in one embodiment of the present invention.

A camera 701 is used to photograph a 3D image target 700 under a spacing signal processing mode, a range finder 702 photographs a measured image distance processing mode for the independent small areas with respect to the 3D image target 700. Meanwhile, two cameras having a spacing signal processing mode function and an independent small area processing mode function, respectively can be combined into one laminated camera having said two functions, and both kinds of images are input into a computer 703 to be processed. Then, the computer outputs the spacing signal/small area processing image to a laminated photo printer 704. The laminated photo printer 704 then prints the image to finally make a laminated photo 705 for being viewed.

The present invention has the following reformative functions:

(a) Reformative Functions of the CCD or CMOS or OLCD Sensor of the Image Element When the built-in CCD or CMOS or OLCD sensor of a common digital camera is photographing a target, the image element sensors of the whole area act together to photograph images and to automatically focus. However, the image element sensors of the system for making 3D color pictures of the present invention, during operations, controls focusing spacing signals in the way of phase detection and focusing of a camera, wherein the spacing signal analyzer gives the open/close instruction output by the spacing signal about the deviated focusing or accurate focusing of each single CCD or CMOS or OLCD sensor. The desired output spacing signal image appears at a specified position.

(b) Digital Laminated

When photographing a target, a common digital camera photographs an image photo and stores it and then photographs and stores the next image. The digital laminated camera of the present invention is different from such common digital camera in terms operation, namely, (I) before photographing, the camera of the present invention must be pre-set to the automatic or manual focusing control operation unique to the digital laminated camera, or it is set to the operation mode of the common digital camera.

(II) When it is set to be used as a digital laminated camera, the image of the foremost image of each phase is focused, then a focusing setting for automatic or manual photographing is performed for images above the second layer in each phase/

(c) Laminated Photo Image Printer

The operating features of the laminated photo image printer of the present invention are that a plurality of photos can be printed consecutively and hot pressing bonding can be repeated for many times using chemicals.

Although the present application is described in the above with reference to the preferred embodiment of the present invention, such descriptions are exemplary but not restrictive. Those skilled in the art can make various improvements and modifications to the present invention on the basis of the disclosure of the present invention, and all these improvements and modifications should fall within the protection scope of the present invention as long as they do not depart from the concept of the present invention. The protection scope of the present invention is defined by the appended claims.

FIG. 4

S10 operation mode setting for laminated digital camera

S11 digital camera performing focusing setting for common image focal point (manually or automatically)

S41 turning on the image sensors of independent small image areas

S30 built-in range finder (manually or automatically) dividing the whole image into over 100 independent small areas and continuously and repeatedly measuring the distances thereof.

S21 performing the focusing setting for the foremost point of the first layer image with respect to the photographed image behind the transparent object S12 digital camera (manually or automatically) photographing images S31 in combination with the built-in range finder, continuously and repeatedly measuring distances from different positions of the images of the target at a speed of over 22 times per second and sending the obtained data to the photographing digital camera S22 camera performing focusing setting for each of the layers above the second layer (manually or automatically)

S23 camera performing focusing setting for the foremost point of the first layer image (manually or automatically)

S24 camera photographing images of each of the layers above the second layer (manually or automatically)

S25 processing the image spacing signal of each individual CCD or CMOS or OLCD sensor in the camera.

S27 image signal storing

S26 signal processing by signal analyzer

S32 digital camera controlling to photograph different positions of the same image using data sent by the built in range finder S42 receiving numerical values of colors in the image through electromagnetic spectrum S43 obtaining numerical values of colors in the image from the photographed image of the target, and inserting them, together with preset colors, in the database, into small areas to replace the original images S13 printing images by a common photo printer on the market S28 laminated photo printing image processing S29 laminated image photo jointing processing

TABLE 1

| code | small area positions of image element sensors | distributing to the printing material positions of the printer | image printing layer | image printing material |
|---|---|---|---|---|
| a | *a1~a30 | → $1^{st}$-a1~a30 | layer 1 | transparent or |
| b | *b1~b14 | → $2^{nd}$-b1~b14 | layer 2 | non-transparent |
| c | c1~c20 | → $3^{rd}$-c1~c20 | layer 3 | film or paper |
| d | d1~d23 | → $4^{th}$-d1~d23 | layer 4 | |
| e | e1~e29 | → $5^{th}$-e1~e29 | layer 5 | |
| f | f1~f32 | → $6^{th}$-f1~f32 | layer 6 | |
| g | g1~g34 | → $7^{th}$-g1~g34 | layer 7 | |
| h | h1~h37 | → $8^{th}$-h1~h37 | layer 8 | |
| xy | xy1~xy9,000,000 | → $9^{th}$-$50^{th}$-xy1~xy9,000,000 | images above layer 9 | |
| i | i1~i3,555,555 | → ∞-i1~i3,555,555 | bottom layer distant view image | |

What is claimed is:

1. A digital camera comprising:
    an electromagnetic spectrum radiator for emitting electromagnetic spectrums to a target when photographing images of the target;
    a charge coupled device (CCD) sensor, a complementary metal oxide semiconductor (CMOS) sensor and/or an organic liquid crystal display (OLCD) sensor, which constitute an independent image element of the photographed image and receive electromagnetic wave radiation bands propagating in the air in different wavelengths as a result of color reactions of the target to said electromagnetic spectrums;
    a memory for storing different color values corresponding to different electromagnetic wave radiation bands; and a photographing system, which divides the photographed image into independent images of small area, and which compares the electromagnetic wave radiation band received by the sensors in each independent image of small area to the different color values in the memory, and then inserts colors corresponding to said color values back to said image of small area, wherein, when there is a transparent object between the camera and the target, before photographing the image, a focusing setting is performed to a foremost point of a first layer of image of said target and a focusing setting is performed to each of layers above a second layer of image in advance, then the foremost point of the first layer of image is photographed and each of the layers above the second layer of image is photographed, wherein said focusing setting and photographing are performed manually or automatically.

2. The digital camera according to claim 1 further comprising:

a spacing signal analyzer which sends an output of a spacing signal about deviated or accurate focusing of each single CCD or CMOS or OLCD sensor so as to open the CCD or CMOS or OLCD sensor with accurate focusing and close the CCD or CMOS or OLCD sensor with deviated focusing;

a built-in range finder for continuously and repeatedly performing range finding and focusing to different positions of an image at a speed; and wherein, the photographing system continuously photographs different positions of the target with accurate focusing with reference to the control by the spacing signal analyzer to open/close the CCD or CMOS or OLCD sensor, superimposes the obtained small area images corresponding to said different positions to finally obtain a 3D image of the target image.

3. A system for making 3D color pictures comprising the digital camera of claim 2, wherein the digital camera is used for photographing images of a spacing signal processing mode and/or images of independent small area processing mode, said images being input into a laminated photo printer to be printed into laminated 3D photos.

4. The digital camera according to claim 1, wherein the photographed image is divided into 800-900000 independent images of small area, and/or said built-in range finder performs range finding and focusing at a speed of 22-10000 times per second.

* * * * *

UNITED STATES PATENT AND TRADEMARK OFFICE
CERTIFICATE OF CORRECTION

| | | |
|---|---|---|
| PATENT NO. | : 9,451,241 B2 | Page 1 of 1 |
| APPLICATION NO. | : 13/727989 | |
| DATED | : September 20, 2016 | |
| INVENTOR(S) | : Leung Chi Wai | |

It is certified that error appears in the above-identified patent and that said Letters Patent is hereby corrected as shown below:

In the Specification

Column 2, Line 46  Replace "layer of image is photographed, \herein said focusing" with
-- layer of image is photographed, wherein said focusing --

Column 3, Line 37  Replace "the CCD censor. CMOS sensor and ° LCD sensor" with
-- the CCD censor, CMOS sensor and OLCD sensor" --

Column 4, Line 15  Replace "repeatedly performed alter each" with
-- repeatedly performed after each --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*